US005497723A

United States Patent [19]
Chase

[11] Patent Number: 5,497,723
[45] Date of Patent: Mar. 12, 1996

[54] BOAT BUMPER

[76] Inventor: Wylie Chase, 4515 Motorway, Waterford, Mich. 48328

[21] Appl. No.: 261,404

[22] Filed: Jun. 17, 1994

[51] Int. Cl.$^6$ ................................................ B63B 59/02
[52] U.S. Cl. ............................................................ 114/219
[58] Field of Search .................................... 114/219, 220; 405/212–215

[56] References Cited

U.S. PATENT DOCUMENTS

| | | | |
|---|---|---|---|
| 3,486,342 | 12/1969 | Aks . | |
| 4,124,986 | 11/1978 | Postma | 114/219 |
| 4,135,467 | 1/1979 | Loire et al. | 114/219 |
| 4,227,832 | 10/1980 | Leone et al. | 114/219 |
| 4,337,009 | 6/1982 | Jackson | 405/212 |
| 4,773,349 | 9/1988 | McKinney | 114/219 |
| 4,968,182 | 11/1990 | Westwell | 405/215 |

FOREIGN PATENT DOCUMENTS 0893712  12/1981  U.S.S.R. .................. 114/219

Primary Examiner—Jesus D. Sotelo
Attorney, Agent, or Firm—Gifford, Krass, Groh, Sprinkle, Patmore, Anderson & Citkowski

[57] ABSTRACT

An improved dock bumper having a square tubular frame, a pair of cushions, and mounting brackets is disclosed. The frame is formed of a crosspiece and a pair of upright posts. The mounting brackets are provided with hole groupings for mounting to either the underside or stringer of a dock. The cushions are formed of blow molded plastic and are molded in a unitary construction in two semi-circular half portions, each having an inner channel formed to receive the vertical posts.

12 Claims, 3 Drawing Sheets

5,497,723

1
BOAT BUMPER

BACKGROUND OF THE INVENTION

I. Field of the Invention

This invention relates to a boat bumper for mounting to a dock, and more particularly, for boat bumpers having resilient cushions supported on frames which may be mounted to an underside of the dock.

II. Background of the Invention various devices are known for protecting a boat from damage when the boat is secured or maneuvered alongside a dock or pier. Typical of such devices is the boat dock bumper disclosed by McKinney in U. S. Pat. No. 4,773,349. McKinney discloses a boat dock bumper including an elongated vertical plate. The vertical plate has an outer face covered with a rubber-like material to contact the boat. The vertical plate is mounted by way of a spring steel strap to the dock to absorb the shock when the vertical plate is contacted by the boat.

It is also known as is disclosed in Postma, U.S. Pat. No. 4,124,986, to provide a concrete dock with a wooden U-shaped bumper device having a pair of upright portions and a crosspiece extending beneath the dock. The upright portions of the bumper are received in slots formed in the concrete dock to receive the shock.

It is also known to mount a bumper to a dock support as disclosed by Westwell in U.S. Pat. No. 4,968,182. Westwell discloses a rub strip which is adapted to be mounted to a cylindrical dock support leg holder. The dock support leg holder is mounted to the dock to receive upright legs which support the dock in position. The rub strip protrudes outwardly from the dock.

However, the devices of Westwell and Postma are specifically formulated to be adapted to particular dock structures. The boat bumper of McKinney is suitable for mounting to docks which have lateral stringers at the edge of the planks.

The Postma structure is suited for use with concrete dock sections. These devices are quite costly. Therefore, it would be advantageous to provide an economical bumper device which is adapted to mount to a variety of docks or marine structures and which is easy to mount.

SUMMARY OF THE INVENTION

The present invention provides a boat bumper assembly including a metal frame having a crosspiece and a pair of upright posts extending from each end of the crosspiece. A pair of cylindrical shock absorbing devices are formed in the two semi-circular portions, each having a cavity formed by flexible walls. The two semi-circular portions have a channel to receive the frame. A pair of mounting brackets extend between the crosspiece and an underside of the dock to mount the frame to the dock. The mounting brackets are adjustable to facilitate mounting of the frame to either the planking or lateral stringers of the dock.

BRIEF DESCRIPTION OF THE DRAWINGS

The present invention will be more fully understood by reference to the detailed description of the preferred embodiment of the present invention when read in conjunction with the accompanying drawing, in which like reference characters refer to like parts throughout the views, and in which.

Figure 1:
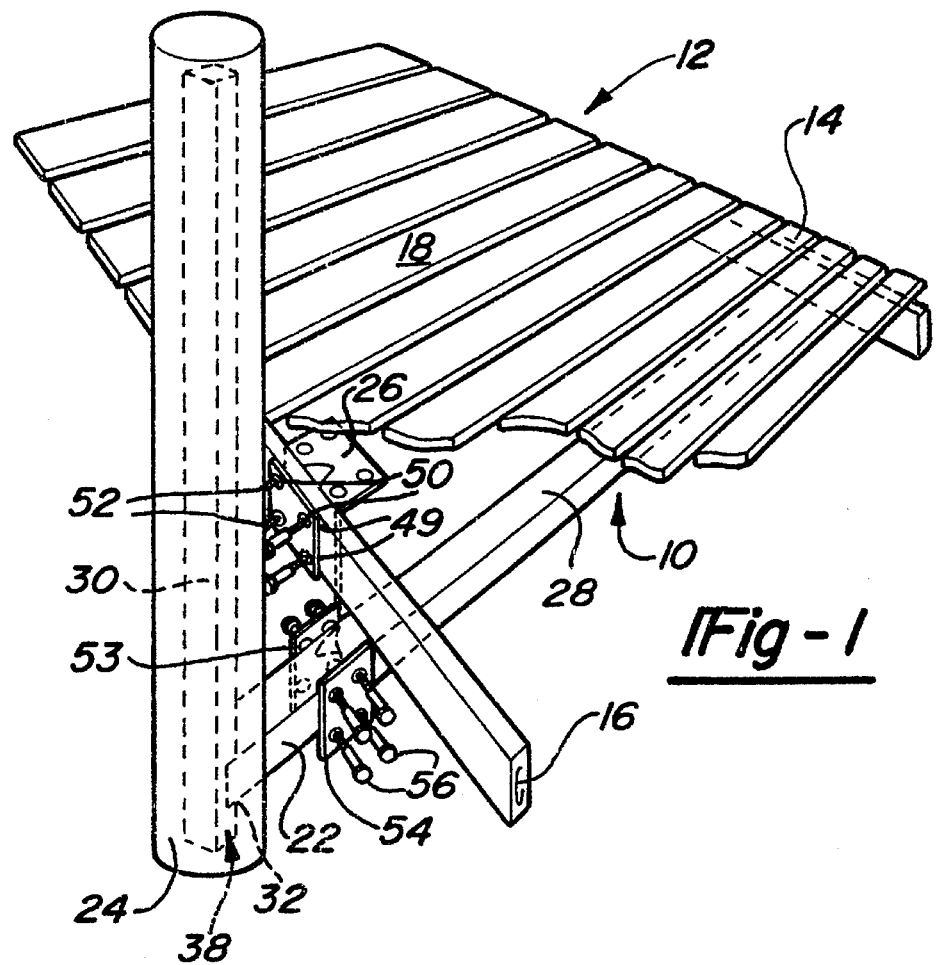
FIG. 1 is a perspective view of a dock and boat bumper assembly in accordance with the invention.
Figure 2:
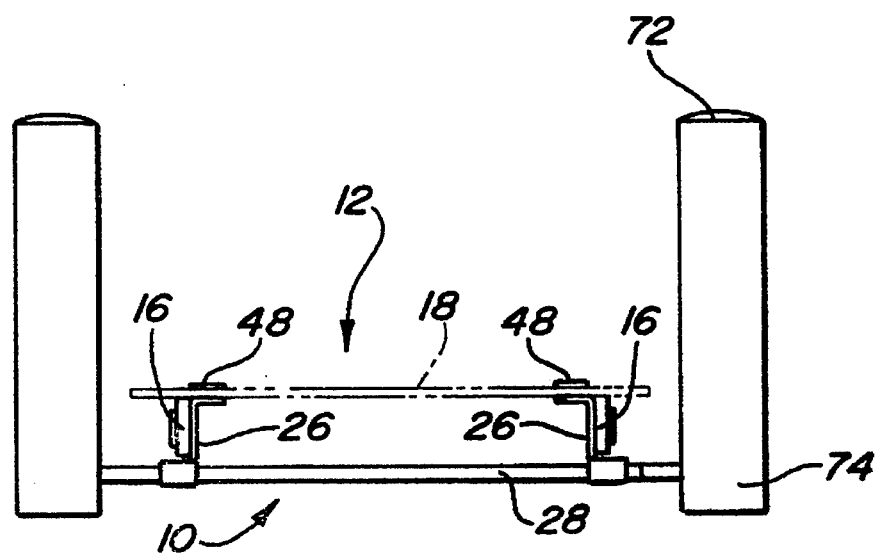
FIG. 2 is a side view of the boat bumper assembly mounted to a dock in accordance with the present invention.

DETAILED DESCRIPTION OF THE PREFERRED EMBODIMENT shown in FIGS. 1 and 2 is a preferred embodiment of a boat bumper assembly 10 suitable for mounting to a dock 12. The dock 12 is of a conventional type formed in sections 14 so as to be assembled to a desired length. In northern climates, this type of dock may be removed from the body of water in the fall to avoid damage due to ice during the winter. Typically, each section 14 includes a pair of lateral stringers 16 supporting a plurality of planks 18. The planks 18 are generally spaced apart to permit drainage. Typically, a number of sections 14 are interconnected and supported by upright posts (not shown) which extend to the bottom of the body of water.

Figure 6:
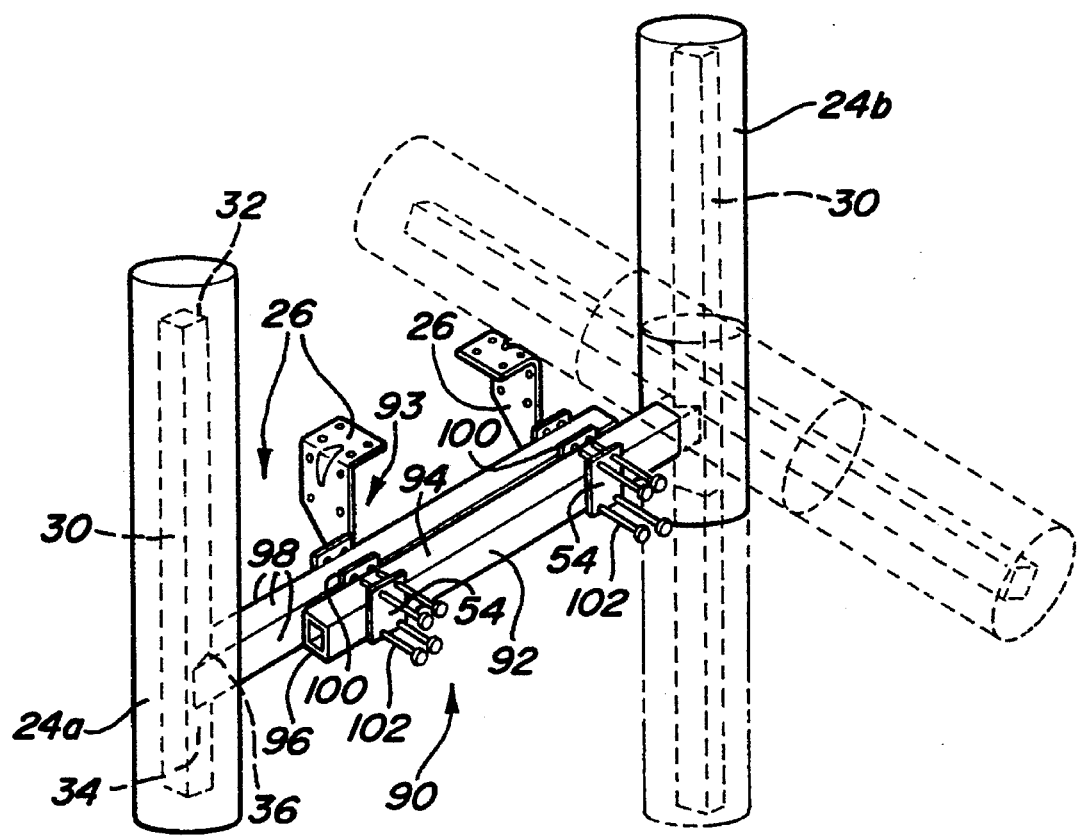
FIG. 6 is a perspective view of an alternative preferred embodiment of the invention.

As best shown in FIG. 1, the boat bumper assembly 10 according to the invention includes a frame 22 and a pair of shock absorbing members 24 and a pair of mounting brackets 26. The frame 22 includes a horizontally extending crosspiece 28 and a pair of posts 30 extending from each end 32 of the crosspiece 28. The crosspiece 28 and posts 30 are advantageously square and are formed of a rigid, corrosion resistant material such as aluminum tubing. As shown in FIG. 6, a V-Shaped notch 36 is formed in each end of the crosspiece 28. Preferably, each post is welded in position with two adjacent sides 32, 34 contacting the notch 36. The posts 30 are mounted to the crosspiece 28 with a lower end 38 (FIG. 1) extending approximately 1-½ inches beneath the crosspiece 28. The posts 30 have a total length of approximately 32 inches. The crosspiece 28 has a length sufficient to extend fully underneath the width of the dock and provide sufficient space for the posts 30 and cushions 24 to extend upwardly without contacting the planks 18 of the dock. A typical length is approximately six feet.

Figure 3:
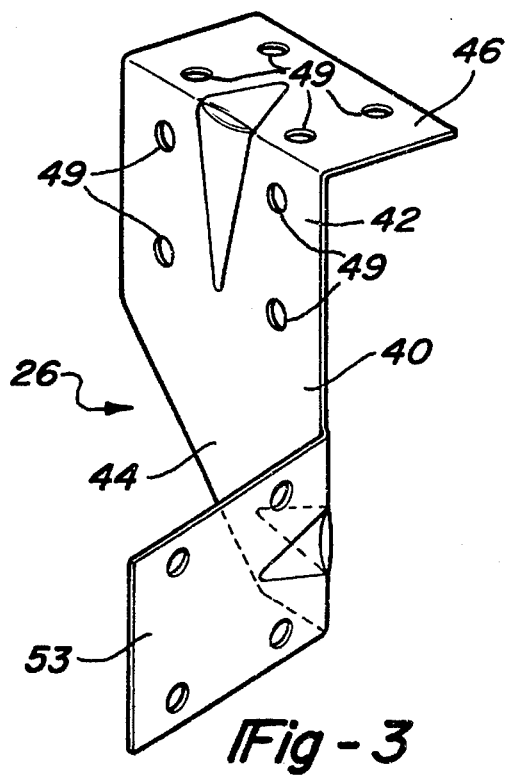
FIG. 3 is a perspective view of the mounting bracket according to the invention.

As best shown in FIG. 2, the frame is mounted to the dock 12 by the pair of mounting brackets 26. The mounting brackets 26 facilitate mounting to either the planks 18, as shown in FIG. 1, or stringers 16 of the dock, as shown in FIG. 2. As shown in FIG. 3, each bracket 26 has an elongated portion 40 with a top end 42 and a bottom end 44. The top end 42 has an upper flange 46 extending orthogonally to the elongated portion 40. Both the top end 42 and the flange 46 have an identically spaced grouping of holes 49.

As shown in FIG. 1, when the bracket 26 is bolted to the stringers 16 by positioning the holes 49 of the top end 42 of the bracket on one side of the stringer 16 and positioning a backing plate 48 on an opposite side, bolts 52 and nuts (not shown) secure the backing plate 48 and the bracket 26 to the stringer 16. The backing plate 48 has four holes 50 spaced complimentarily with the grouping of holes 49 of the flange 46.

As shown in FIG. 2, when the bracket 26 is mounted to the undersurface of the planks 18 of the dock 12, the backing plate 48 is positioned on top of the plates. As shown in FIG. 3, the bracket 44 also has a lower flange 53 extending at right angles to both the elongated portion 40 and upper flange 46. As shown in FIG. 1, the lower flange 53 facilitates mounting of the crosspiece 28 to the brackets 26. Parallel sides of the crosspiece 28 are held between the lower flange 53 and a mounting plate 54 by bolts 56. The brackets are positioned anywhere along the length of the crosspiece. The bracket 26, backing plate 48, and mounting plate 54 are formed of suitable corrosion resistant material, such as stainless steel or aluminum.

Figure 4:
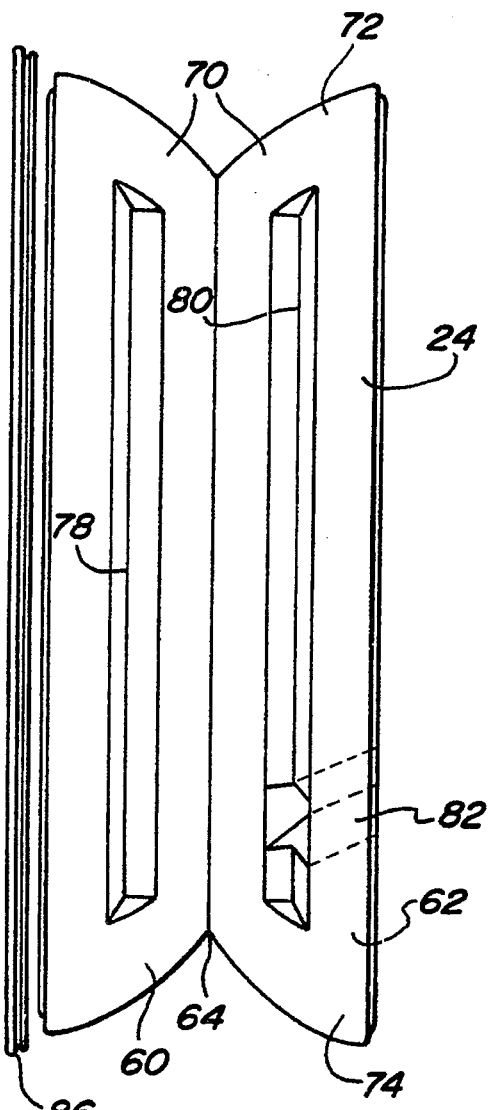
FIG. 4 is a perspective view of a cushion and in an open position prior to assembly.
Figure 5:
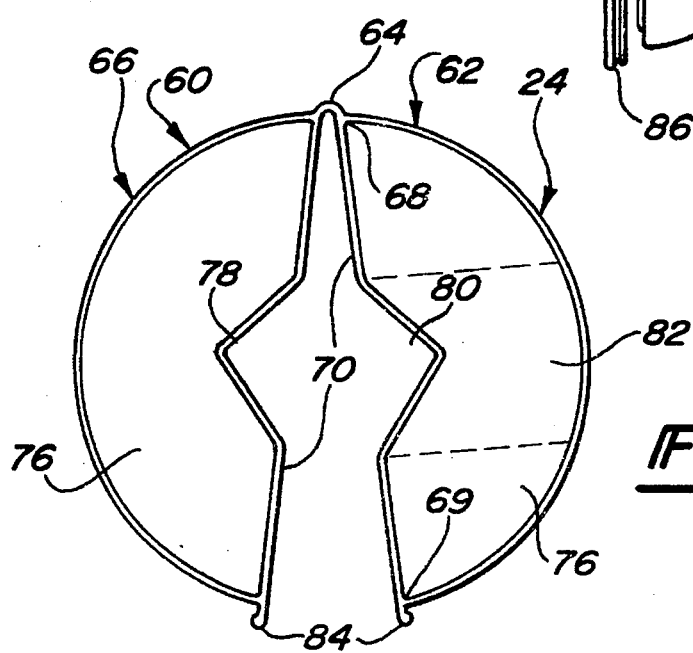
FIG. 5 is a cross-sectional view of the cushion of the invention.

As best shown in FIG. 1, the cylindrical cushion members 24 are formed to receive the posts 30 within. As shown in FIGS. 4 and 5, the cushion members 24 include a front portion 60 and back portion 62 joined together by a connecting strip 64.

The front portion 60 and back portion 62 each have a cavity 76 defined by a curved outer wall 66, generally planar inner wall 70, a top end 72 and a bottom end 74. The generally planar inner wall 70 is formed to extend between an inner edge 68 and an outer edge 69 of the outer wall 66. The cavity 76 is thus enclosed and filled with air. The outer walls and ends are flexible to permit the cushion 24 to resiliently absorb shocks from a contact with a boat (not shown). V-shaped channels 78, 80 are formed in the respective inner walls 70 of the front and back portions to receive the post 30. The back portion 62 also includes a square opening 82 extending from the channel 80 through the cavity to the outer wall 66. The opening 82 is formed to accept the crosspiece 28. Advantageously, the cushion is formed with the connecting strip 64 extending between inner edges 68 of the front and back portions. A keeper portion 84 is formed on the outer edges of the front portion.

The cushion member 24 is mounted on the frame by passing the post 30 through the square opening 82 in the rear portion until the end of the crosspiece 28 extends into the opening 82 and the post 30 is received in the channel 80 of the rear portion 62. The front portion 60 and back portion are folded together with the connecting strip 64 acting as a hinge. A C-shaped closure member 86 formed of rigid material, such as an aluminum channel, slides over the keeper portions 84 of the front and rear portions to lock the portions together. In this way, the cushion 24 is positioned on the frame with the front portion 60 extending outwardly from the ends of the planks 18 to absorb any shocks from boats. The channels 78, 80 engage the post 30 to prevent the cushion member from rotating about the post. Advantageously, the cushion member may be formed in a unitary molding by blow molding of a suitable flexible material such as polyethylene or polyurethane.

An alternative preferred embodiment of a boat bumper assembly 90 according to the invention is shown in FIG. 6. Shown in FIG. 6 is a pair of frames 92, each having a cushion member 24 and a pair of mounting assemblies 93. The embodiment may consist of a single frame 92 and cushion member 24. The frame 92, includes a crosspiece 94 and one vertically aligned post 30 extending from one end of the crosspiece 94. The vertically aligned post 30 is mounted to one end of the crosspiece 94 in the same manner as disclosed above. Another end 96 of the crosspiece 94 is square. The crosspiece 94 is mounted to the dock by way of the pair of mounting brackets 26 in the same manner as disclosed above. The crosspiece 94 has a square cross section with two pairs of parallel sides 98, thus permitting the crosspiece to be mounted with the post aligned in any four directions, depending upon which pair of sides 98 of the cross member is sandwiched between the mounting bracket 26 and mounting plate 54. Two frames 92 may be mounted on opposite sides of a spacer 100 by using long bolts 102.

In this manner, cushion member 24a, 24b may be mounted on both sides of a dock regardless of the width of the dock and may be mounted in different alignments as shown in FIG. 7, where one cushion member 24a is mounted in a vertical alignment and another cushion member 24b shown in both vertical and horizontal alignments (in phantom).

Thus, the invention provides an easily installed, inexpensive boat dock bumper. It is clear that variations to the invention may be made without departing from the scope and spirit of the invention. For instance, it is not necessary to have two upright posts as disclosed. The frame may be provided with only one upright post and the crosspiece may be much shorter. Likewise, the bumper frame may be mounted to sea walls and piers by modifying the bracket. Likewise, many variations of the frame and bumper which are disclosed are contemplated to be within the scope of the invention.

I claim:

1. A boat bumper device for mounting to a dock having a top surface extending along a longitudinal axis, said bumper device comprising:

a frame having a cross member having a pair of ends, said cross member extending beneath said top surface normal to said longitudinal axis;

at least one post extending upwardly from one of said pair of ends;

a shock absorbing member mounted to said post, said shock absorbing member being spaced apart from said dock;

means for mounting said cross member to said marine structure.

2. The boat bumper device of claim 1, wherein said shock absorbing member is elongated and has an axial opening adapted to receive said post.

3. The boat bumper device of claim 1, wherein said shock absorbing member is a generally cylindrical member.

4. The boat bumper device of claim 3, wherein said generally cylindrical member is formed by blow molding.

5. The boat bumper device of claim 1, wherein said at least one post comprises a pair of posts, each of said pair of posts mounted to a respective one of said pair of ends.

6. The boat bumper device of claim 1, wherein said means for mounting further comprises means for mounting to the underside of a dock.

7. The boat bumper device of claim 1, wherein said cross member has two pairs of spaced apart parallel sides.

8. The boat bumper device of claim 7, wherein said means for mounting comprises a bracket and mounting plate disposed to sandwich one of said pairs of sides therebetween.

9. The boat bumper of claim 8, wherein said means for mounting is adapted to receive a pair of cross members.

10. A boat bumper device for mounting to a marine structure, said bumper device comprising:

a frame having a cross member having a pair of ends and two pairs of spaced apart parallel sides;

a post extending upwardly from one of said pair of ends;

a shock absorbing member mounted to said post; and means for mounting said cross member to said marine structure.

11. The boat bumper device of claim 10, wherein said means for mounting comprises a bracket and mounting plate disposed to sandwich one of said pairs of sides therebetween.

12. The boat bumper of claim 10, wherein said means for mounting is adapted to receive a pair of cross members.

\* \* \* \* \*